(12) United States Patent
Dayama et al.

(10) Patent No.: US 10,885,472 B2
(45) Date of Patent: Jan. 5, 2021

(54) DYNAMIC TRANSPORTATION POOLING

(71) Applicant: International Business Machines Corporation, Armonk, NY (US)

(72) Inventors: Pankaj Dayama, Bangalore (IN); Vijay Ekambaram, Bangalore (IN); Lohit K. Namboodiri, Bangalore (IN); Vinayaka D. Pandit, Bangalore (IN); Santosh Penubothula, Bengaluru (IN)

(73) Assignee: International Business Machines Corporation, Armonk, NY (US)

(*) Notice: Subject to any disclaimer, the term of this patent is extended or adjusted under 35 U.S.C. 154(b) by 694 days.

(21) Appl. No.: 15/194,958

(22) Filed: Jun. 28, 2016

(65) Prior Publication Data
US 2017/0372235 A1 Dec. 28, 2017

(51) Int. Cl.
*G06Q 10/02* (2012.01)
*G06Q 10/10* (2012.01)
(Continued)

(52) U.S. Cl.
CPC .......... *G06Q 10/02* (2013.01); *G06Q 10/06* (2013.01); *G06Q 10/109* (2013.01); *G06Q 20/145* (2013.01)

(58) Field of Classification Search
CPC ..................................................... G06Q 10/02
(Continued)

(56) References Cited

U.S. PATENT DOCUMENTS 7,840,427 B2 * 11/2010 O'Sullivan ............ G06Q 50/30
705/6
7,974,771 B2 * 7/2011 Cobbold ................ G06Q 10/10
701/117
(Continued)

FOREIGN PATENT DOCUMENTS

KR 102042848 B1 * 11/2019

OTHER PUBLICATIONS

Ghoseiri, Keivan. Haghani, Ali. Hamedi, Masoud. "Real-Time Rideshare Matching Problem". http://www.mautc.psu.edu/docs/umd-2009-05.pdf (Year: 2011).*
(Continued)

*Primary Examiner* — Shannon S Campbell
*Assistant Examiner* — Lisa Ma
(74) *Attorney, Agent, or Firm* — Ryan, Mason & Lewis, LLP

(57) ABSTRACT

Methods, systems, and computer program products for dynamic transportation pooling are provided herein. A computer-implemented method includes determining vehicle-sharing user preferences attributed to each of multiple users; identifying vehicle-sharing opportunities involving two or more of the users riding in two or more vehicles, wherein each of the identified vehicle-sharing opportunities comprises (i) a location wherein at least one of the users exits a first of the vehicles and enters a second of the vehicles, wherein the location comprises a vehicle demand that exceeds a pre-determined threshold, and (ii) a temporal range until the vehicles will reach the location, and wherein
(Continued)

said identifying is based on the vehicle-sharing user preferences attributed to each of the users, the current location of each of the vehicles, the destination of each of the vehicles, and traffic information; and outputting each of the vehicle-sharing opportunities to a mobile device of each of the users.

13 Claims, 3 Drawing Sheets

(51) Int. Cl.
  *G06Q 10/06* (2012.01)
  *G06Q 20/14* (2012.01)
(58) Field of Classification Search
  USPC .............................................................. 705/5
  See application file for complete search history.

(56) References Cited

U.S. PATENT DOCUMENTS

| | | | |
|---|---|---|---|
| 2007/0027825 A1* | 2/2007 | Pearce | G06Q 10/02 705/417 |
| 2007/0276595 A1* | 11/2007 | Lewinson | G01C 21/3484 701/533 |
| 2008/0091342 A1* | 4/2008 | Assael | G01C 21/3438 701/533 |
| 2008/0274752 A1* | 11/2008 | Houri | H04W 4/023 455/456.1 |
| 2009/0210276 A1 | 8/2009 | Krumm et al. | |
| 2013/0054281 A1 | 2/2013 | Thakkar et al. | |
| 2015/0006072 A1 | 1/2015 | Goldberg et al. | |
| 2015/0166009 A1* | 6/2015 | Outwater | B60R 25/04 701/2 |
| 2015/0254581 A1 | 9/2015 | Brahme | |
| 2016/0071082 A1* | 3/2016 | Driscoll | G06Q 20/145 705/13 |
| 2016/0321771 A1* | 11/2016 | Liu | G01C 21/3438 |
| 2016/0335576 A1* | 11/2016 | Peng | G06Q 10/06315 |
| 2016/0356615 A1* | 12/2016 | Arata | G06Q 50/30 |
| 2017/0169366 A1* | 6/2017 | Klein | G06Q 50/30 |
| 2018/0032928 A1* | 2/2018 | Li | G06Q 10/02 |

OTHER PUBLICATIONS

Christine Nunez, Taxi-Sharing Boosts Energy Efficiency, but Will Riders Get on Board? Study Argues that Traffic and Pollution Could be Cut if More Travelers Shared a Cab, National Geographic, Sep. 3, 2014.
Lyft, Introducing Lyft Line, 2016, 2. https://www.lyft.com/line.
UperPool, Car Pooling for Today, Alex, Aug. 5, 2014, http://newsroom.uber.com/announcing-uberpool/.
Alex Hern, Uber Claims New Taxi-Sharing Service Saves 120 Tonnes of C02 a Month, The Guardian, Apr. 17, 2015.
HubCab, MIT Senseable City Lab, Exploring New York City Taxi Trails and Sharing Our Way to a More Sustainable Urban Future, May 12, 2014.
U.S. Appl. No. 15/050,642, filed Feb. 23, 2016, entitled, Cognitive Optimal and Compatible Grouping of Users for Carpooling.
Jaffe, Uber and Public Transit are trying to Get Along, Emerging Partnerships Hold Promise for Reducing Car-Reliance, but They Raise Questions About Who's Winning Out in the Deal, CityLab, Aug. 3, 2015.

\* cited by examiner

DYNAMIC TRANSPORTATION POOLING

FIELD

The present application generally relates to information technology, and, more particularly, to transportation technology.

BACKGROUND

Existing taxi-sharing and car-pooling systems commonly suffer from a limited ability to match users to vehicles. Additionally, with existing approaches, taxi aggregators face challenges such as positioning taxis appropriately to meet future demand without incurring costs arising from empty rides. Further, existing approaches also commonly use surge pricing as a result of the unsatisfactory supply-demand matching capabilities of such approaches.

SUMMARY

In one embodiment of the present invention, techniques for dynamic transportation pooling are provided. An exemplary computer-implemented method can include determining one or more vehicle-sharing user preferences attributed to each of multiple users, and identifying one or more vehicle-sharing opportunities involving two or more of the multiple users currently riding in two or more vehicles. In such a method, each of the identified vehicle-sharing opportunities comprises (i) a location wherein at least one of the two or more users exits a first of the two or more vehicles and enters a second of the two or more vehicles, wherein the location comprises a vehicle demand that exceeds a pre-determined threshold, and (ii) a temporal range indicating an amount of time until the two or more vehicles will reach the location. Additionally, in such a method, the identifying step is based on (a) the vehicle-sharing user preferences attributed to each of the two or more users, (b) the current location of each of the two or more vehicles, (c) at least one stated destination of each of the two or more vehicles, and (d) one or more items of traffic information. Further, such a method also includes outputting each of the identified vehicle-sharing opportunities to a mobile device of each of the two or more users.

In another embodiment of the invention, an exemplary computer-implemented method can additionally include generating a payment model attributed to the identified vehicle-sharing opportunities, wherein the payment model is based at least on a demand forecast related to the location of each of the identified vehicle-sharing opportunities. Such a method can also include authenticating the at least one user to the second vehicle subsequent to receiving an acceptance of one of the identified vehicle-sharing opportunities from the mobile device of the at least one user, and transmitting a payment request to the mobile device of each of the two or more users in accordance with the payment model subsequent to said authenticating.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
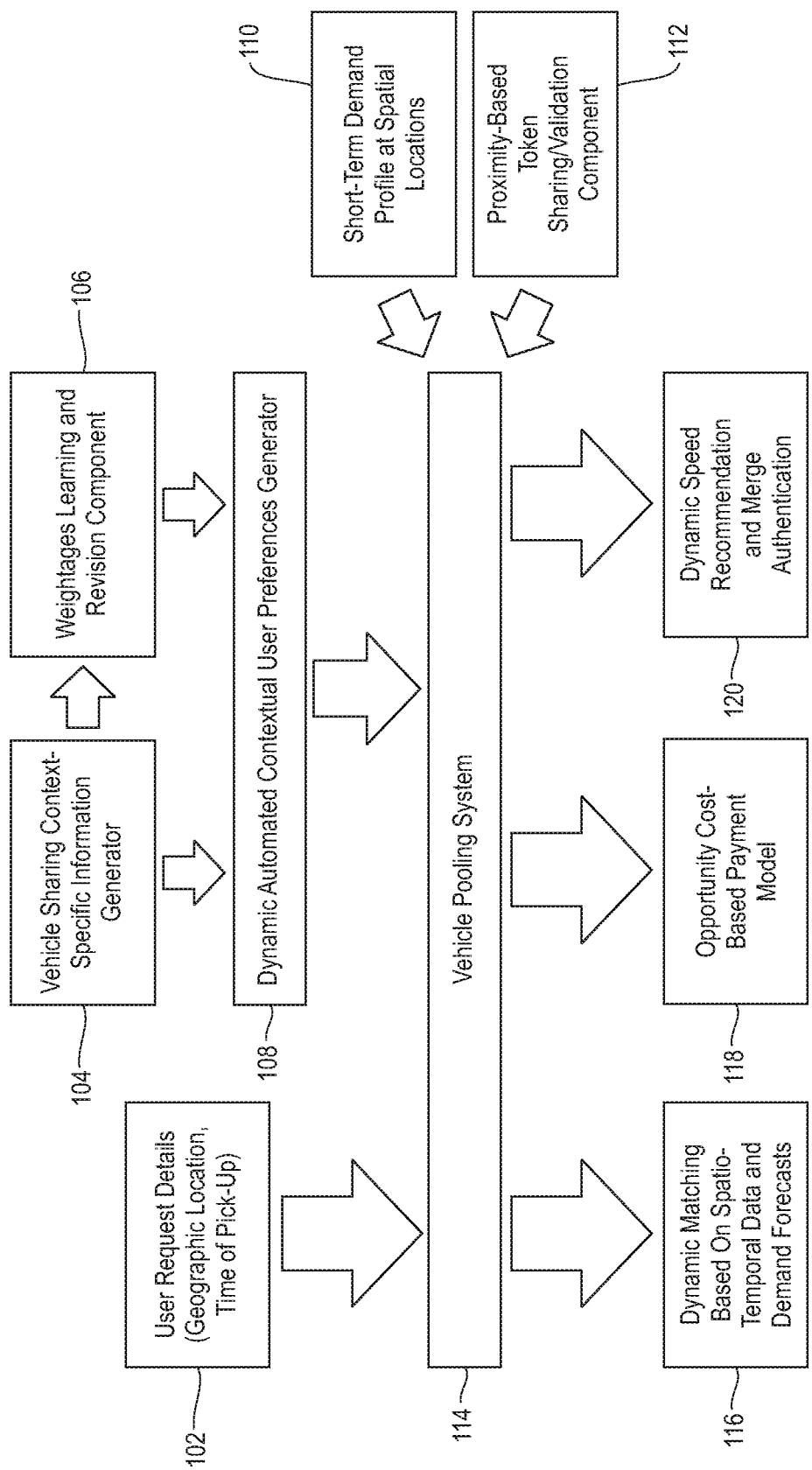
FIG. 1 is a diagram illustrating system architecture, according to an exemplary embodiment of the invention.

As described herein, an embodiment of the present invention includes dynamic transportation pooling for maximizing demand coverage and social utility. At least one embodiment of the invention includes merging two or more vehicle (such as a taxi, car, van, bus, etc.) passengers based on user preferences selected and/or implemented via user interfaces (UIs) on user devices (such as mobile devices, tablets, smart phones, etc.). One or more embodiments of the invention can also include providing one or more incentive mechanisms beneficial for vehicle passengers, vehicle drivers, and vehicle aggregators (for example, the owner of a fleet of taxis) based on supply-demand alignments and virtual waiting time reductions.

As further detailed herein, at least one embodiment of the invention includes splitting a user's trip into two or more segments (including one or more vehicles) based on various factors such as, for example, other geographically-proximate ongoing trips, a determination of one or more high-demand points or locations, one or more user preferences (such as for example, waiting time limits, a maximum number of switches per ride, and profiles of co-passengers), and cost implications for all participants (including passengers, drivers, and vehicle aggregators).

Additionally, one or more embodiments of the invention include performing optimal dynamic matching of passengers travelling in different vehicles based on the respective destination and the respective current location of each passenger, ensuring that parameters such as the wait time (at each of one or more vehicle switches) and the number of vehicle switches are within limits that are pre-specified by each passenger/user. Locations and/or points of merging (of two or more passengers) can be determined based on an underlying short-term demand forecast at different spatial and/or geographic points. The short-term forecast at different spatial points can be determined, for example, by examining the demand pattern for the past several months as well as current requests to a vehicle/taxi aggregator and/or application.

At least one embodiment of the invention also includes generating and/or implementing an opportunistic cost-based revenue-sharing model for encouraging participation in the trip merging mechanism by rewarding customers/passengers, vehicle drivers and vehicle aggregators. Such a model can include an opportunity cost-based payment model for vehicle drivers and passengers based on various details of the trip corresponding to the transaction, including a merging decision (with whom and where) encompassed within the trip, and the waiting time(s) of the passenger during the trip. Also, in one or more embodiments of the invention, such a model can include additional incentive to passengers for segmenting and/or merging at high-demand points.

Further, such a model can include providing multiple merging options, each with an estimated cost, to the user for selection (via a UI on a user device such as a mobile device). Such a model can additionally include considerations of utility for merging. For example, a vehicle aggregator can save on overall travel costs and/or increases in utilization, vehicle drivers may lose parts of trips, and hence revenue, if a passenger shifts to another vehicle at a merging point, and a passenger may have to wait, walk, and/or otherwise adjust with other passengers, etc., as a result of a merge.

At least one embodiment of the invention can also include implementing a virtual reduction of wait times for users in switching hubs through speed recommendations. As used herein, a "speed recommendation" refers to a notification (to the user/passenger) that includes a temporal range until the arrival of a potential merging vehicle at a particular switch junction. Such temporal ranges can be computed and/or determined using information such as, for example, average speed on different road segments from historical data, as well as current traffic information and the remaining distance to be covered to reach the merging point for each of the vehicles which are potentially going to merge. Based on such information, at least one embodiment of the invention can include computing the temporal range. Also, in at least one embodiment of the invention, such a speed recommendation can be provided to the driver (not to the passenger).

Additionally, one or more embodiments of the invention can include implementing proximity-based token sharing and/or validation between mobile devices to prevent user-vehicle mapping issues at switch hubs during merging trips, as well as to approve mergers at switch hubs, as further detailed in connection with FIG. 1.

By way of illustration of an embodiment of the invention, consider the following example. User1 requests Taxi1 from Location1 to Location4 at time $t_1$, and User2 requests Taxi2 from Location2 to Location4 at time $t_2$. An example embodiment of the invention includes subsequently determining (via an algorithm) the feasibility of merging Taxi1 and Taxi2. Based on this determination, User1 is queried (via a UI on User1's mobile device, for example) regarding a potential switch to Taxi2 at Location3. Upon acceptance of this switch proposal (wherein User1 can accept the proposal via the same UI on User1's mobile device), both User1 and User2 share Taxi2 to Location4 from Location3.

Additionally, such an example embodiment of the invention includes determining (via implementation of an algorithm) a fair payment to be made by each of User1 and User2, wherein a taxi aggregator (corresponding to Taxi1 and/or Taxi2) can share an appropriate amount of the revenue with the drivers of both Taxi1 and Taxi2. In one or more embodiments of the invention, computing the fair payment by the users and the appropriate amount of revenue to be shared by the drivers can include determining the amount of the total reduction in cost (for example, the reduction in fuel cost) as a result of merging the trips (as against no merging). Further, in an example embodiment of the invention, such gains could be shared among all parties (drivers and passengers) involved based on waiting time for passengers, driver fuel cost and demand at merging point.

Also, by way of example, Location3 (that is, the switch/merge point/hub in this example) can be a low-demand point, whereas a separate location (say, Location3') can represent a high-demand location currently observing surge pricing. In this example scenario, Taxi1 can wait at Location3 for a customer/passenger or make an empty ride from Location3 to Location3' to pick-up a customer/passenger. As such, at least one embodiment of the invention includes determining a point of merging trips so as to align the available vehicles (taxis, in this example) with high-demand locations.

Accordingly, by way of illustration of such an embodiment, consider the following example scenario. User1 requests Taxi1 from Location1 to Location4 at time $t_1$, and User2 requests Taxi2 from Location2 to Location4 at time $t_2$. An example embodiment of the invention includes subsequently determining (via an algorithm) the feasibility of merging Taxi1 and Taxi2. Based on this determination, User1 is queried (via a UI on User1's mobile device, for example) regarding a potential switch to Taxi2 at Location3', a high-demand location, where Taxi1 is more likely to get a new request/passenger than at Location3, a lower-demand location. Upon acceptance of this switch proposal (wherein User1 can accept the proposal via the same UI on User1's mobile device), both User1 and User2 share Taxi2 to Location4. As also noted above in the previously-detailed example, such an example embodiment of the invention can further include determining a fair payment to be made by each of User1 and User2, wherein a taxi aggregator (corresponding to Taxi1 and/or Taxi2) can share an appropriate amount of the revenue with the drivers of both Taxi1 and Taxi2.

FIG. 1 is a diagram illustrating system architecture, according to an embodiment of the invention. By way of illustration, FIG. 1 depicts a vehicle pooling system 114, which receives inputs including user request details 102 (such as geographic locations and pick-up times), and short-term demand profiles for one or more spatial and/or geographic locations 110. Vehicle pooling system 114 can also receive inputs from a dynamic automated contextual user preferences generator 108, which leverages vehicle sharing context-specific information derived from generator 104 and weightages derived from component 106. By way of example, vehicle sharing context-specific information generator 104, which can run continuously in a vehicle-sharing server, can incorporate the generation and/or use of vehicle-sharing context-specific questionnaires based, for example, on user reviews retrieved from vehicle-sharing websites and/or applications. Additionally, vehicle sharing context-specific information generator 104 can incorporate vehicle-sharing context-specific question filling from user profile data (retrieved from mobile context, social network data, user reviews, etc.). Such questionnaires and question filling can attempt to capture, for example, the preferences of each passenger regarding the other passenger with whom he/she will share any ride. Additionally, such preferences can subsequently be used to filter out potential shared passengers.

Also, as depicted in FIG. 1, component 106 learns and revises weightages to be applied to various items of vehicle-sharing context-specific information. For example, component 106 can learn static weightages to be applied to the auto-filled questions personalized to each user using a model trained on historical and/or current review data. Additionally, component 106 can revise these weightages based on user dynamic context learnt from various data sources (medical conditions, appointments, etc.). As utilized via component 106 (and one or more embodiments of the invention, the weightages refer to the relative importance of the questions and/or items of information with respect to the particular end-user.

Based on the generated outputs of generator 104 and component 106, the dynamic automated contextual user preferences generator 108 can automatically construct vehicle-sharing related user constraints, such as, for example, constraints related to acceptable additional travel times and/or distances, an acceptable number of switches (per trip), and co-passenger compatibility preferences. Additionally, the dynamic automated contextual user preferences generator 108 can run continuously in background on the vehicle-sharing server, wherein the constructed constraints can be updated based on user involvement in one or more trips.

Based on the inputs provided by components 102, 108, and 110 (a short-term demand profile for one or more spatial locations, as further detailed below), the vehicle pooling system 114 can generate outputs including dynamic vehicle matching 116, an opportunity cost-based payment model 118, and a dynamic speed recommendation and merge authentication 120. Dynamic matching of different vehicles 116 can be based on one or more items of above-noted spatio-temporal data (such as current customer locations and requested destinations, traffic information, etc.), a demand forecast (such as derived from input 110, for example), and can also incorporate dynamic and contextual user compatibility constraints 108 personalized to the end users in question. Additionally, inputs for generating a dynamic vehicle matching 116 can include the current spatial location of various vehicles, the destination of each of the various vehicles, the passenger preferences of each passenger of the various vehicles, the underlying road network, as well as a short-term demand forecast 110 at one or more (related or nearby) spatial locations.

Based on such inputs, the vehicle pooling system 114 can output a dynamic matching of vehicles 116 for merging along with one or more potential spatial locations for such merging. By way of example, at least one embodiment of the invention includes determining, based on such inputs, an estimated amount of time to reach each of one or more junctions (that is, potential switching/merging hubs) in a road network. Such an embodiment can additionally include determining a potential merging of two or more vehicles in the next "t" minutes along with the location of such a merging by incorporation of user preference constraints as well as a demand forecast at one or more spatial locations, while also ensuring that one or more metrics are optimized. For example, such metric optimization can include the total distance covered by all participating vehicles being minimized, customer wait time being minimized, etc.

As also noted above, the vehicle pooling system 114 can generate an opportunity cost-based payment model 118 for vehicle drivers and passengers based on the trip(s) in question as well as any merging decision encompassed therein. In at least one embodiment of the invention, the vehicle pooling system 114 can utilize a merging decisions (such as generated via component 116), a vehicle aggregator objective (such as, for example, revenue maximization or aggregated contribution margin maximization), and a short-term demand forecast (such as provided via component 110) to generate and/or output a payment model for issuing payments to the participating vehicle drivers (and/or to the participating vehicle aggregators) from the participating passengers.

Such an embodiment can also include considering each of one or more matching recommendations (such as generated via component 116), and for each vehicle involved in a potential matching, computing the expected profit (payment−cost) if the merging is not performed. Additionally, for a vehicle involved in a potential matching, such an embodiment can also include computing the payment to be made by each passenger involved in a potential matching if the merging is not performed. One or more embodiments of the invention can also include computing the payment to be made by each passenger involved in a potential matching such that the utility of each participant involved is more than the base case (that is, the scenario with no merging) and the overall payment is maximized.

Further, as also noted above, the vehicle pooling system 114 can generate a dynamic (real-time) speed recommendation and merge authentication 120 based on one or more merging decisions (such as generated via component 116) and the current location of each vehicle involved in the merge. For example, at least one embodiment of the invention can include generating a speed recommendation (that is, a notification to the user/passenger that includes a temporal range until the arrival of a potential merging vehicle at a particular switch location/junction) based on the estimated time of arrival (ETA) of a potential merging vehicle at the identified merge location/hub. In such an embodiment, the generated speed recommendations attempt to minimize the ETA and the estimated time of departure (ETD) at the switch hub to help reduce the virtual waiting time for the user at the switch hub.

With respect to the merge authentication aspect of component 120, the vehicle pooling system 114 can also incorporate and/or implement a proximity-based token sharing/validation mechanism 112 for use between mobile devices to prevent user-vehicle mapping issues at switch hubs during merging trips. By way of illustration, consider the following example scenario. When user exits a first vehicle (a source vehicle) to switch to another vehicle (a target vehicle) at a switch hub, the mobile device of the driver of the target vehicle can (automatically) transfer the target vehicle token to the user's mobile device. When the target vehicle arrives near the switch hub, the target vehicle notifies, through one or more mobile alerts, all of the users who have the target vehicle token (via their mobile device(s)) using proximity based alert protocols. Beacon based alerts can be used, for example, such that as soon as the target vehicle arrives near the hub, the correct users are identified and notified. Subsequently, when the user enters the target vehicle, token verification between the driver's mobile device and the user's mobile device is carried out in an automated fashion. Also, one or more embodiments of the invention can include alerting the driver of the target vehicle (via a mobile alert/notification) if any user who does not have the target vehicle token enters the target vehicle.

Figure 2:
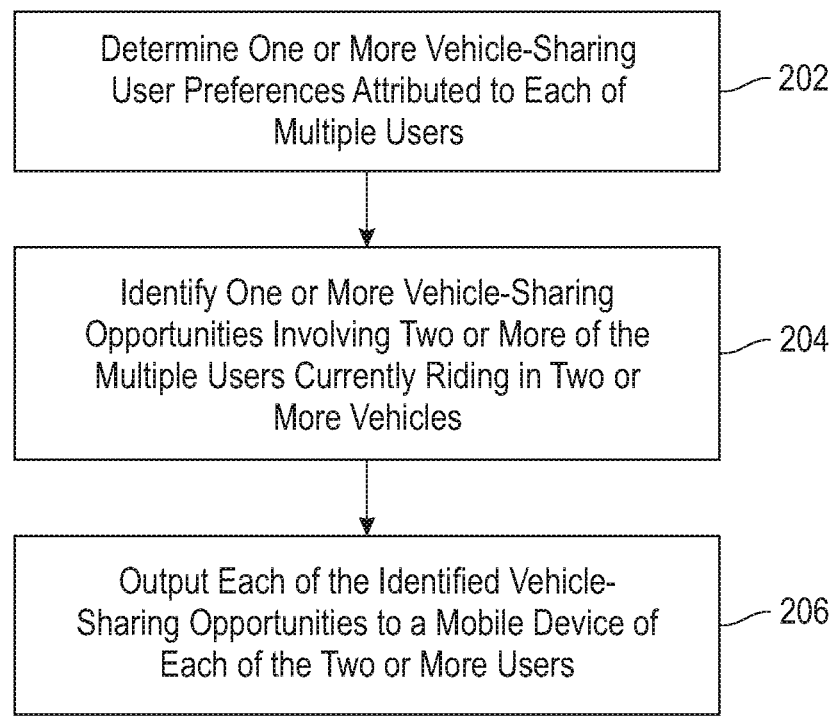
FIG. 2 is a flow diagram illustrating techniques according to an embodiment of the invention.

FIG. 2 is a flow diagram illustrating techniques according to an embodiment of the present invention. Step 202 includes determining one or more vehicle-sharing user preferences attributed to each of multiple users. The vehicle-sharing user preferences can include an acceptable amount of time added to a trip due to vehicle-sharing, an acceptable amount of distance added to a trip due to vehicle-sharing, an acceptable number of switches within a vehicle-sharing opportunity, and one or more preferences related to co-passenger compatibility.

At least one embodiment of the invention can include applying a weight to each of the vehicle-sharing user preferences based on (i) data attributed to a given user and (ii) historical data attributed to one or more additional users, wherein each weight represents a level of importance attributed to a given user preference relative to the other one or more user preferences. Such an embodiment can additionally include updating the weight applied to each of the vehicle-sharing user preferences based on updated data attributed to the given user.

Step 204 includes identifying one or more vehicle-sharing opportunities involving two or more of the multiple users currently riding in two or more vehicles. Each of the identified vehicle-sharing opportunities comprises (i) a location wherein at least one of the two or more users exits a first of the two or more vehicles and enters a second of the two or more vehicles, wherein the location comprises a vehicle demand that exceeds a pre-determined threshold, and (ii) a temporal range indicating an amount of time until the two or more vehicles will reach the location. The temporal range can be based on (i) the current location of each of the two or more vehicles and (ii) geographically-relevant traffic conditions.

Also, the identifying step can be based on (a) the vehicle-sharing user preferences attributed to each of the two or more users, (b) the current location of each of the two or more vehicles, (c) at least one stated destination of each of the two or more vehicles, and (d) one or more items of traffic information. The items of traffic information can include an underlying road network within a pre-determined geographic range of the current location of each of the two or more vehicles and/or the at least one stated destination of each of the two or more vehicles, a demand forecast at the location identified within each of the identified vehicle-sharing opportunities, and geographically-relevant traffic conditions.

Step 206 includes outputting each of the identified vehicle-sharing opportunities to a mobile device of each of the two or more users. The techniques depicted in FIG. 2 can also include generating a payment model attributed to the identified vehicle-sharing opportunities, wherein the payment model is based on (i) one or more vehicle-related revenue objectives and (ii) a demand forecast related to the location of each of the identified vehicle-sharing opportunities. Further, the techniques depicted in FIG. 2 can additionally include authenticating the at least one user to the second vehicle subsequent to receiving an acceptance of one of the identified vehicle-sharing opportunities from the mobile device of the at least one user, wherein the authentication comprises implementing a common token shared by the second vehicle and the at least one user.

Also, an additional embodiment of the invention can further include generating and implementing a payment model attributed to the identified vehicle-sharing opportunities, wherein the payment model is based at least on a demand forecast related to the location of each of the identified vehicle-sharing opportunities. Such an embodiment can also include authenticating the at least one user to the second vehicle subsequent to receiving an acceptance of one of the identified vehicle-sharing opportunities from the mobile device of the at least one user, and transmitting a payment request to the mobile device of each of the two or more users in accordance with the payment model subsequent to said authenticating.

At least one embodiment of the invention (such as the techniques depicted in FIG. 2, for example), can include implementing a service via a transmission server to receive data from a data source and send selected data to users (for example, at a provided destination address of a wireless device, such as a number for a cellular phone, etc.). The transmission server includes a memory, a transmitter, and a microprocessor. Such an embodiment of the invention can also include providing a viewer application to the users for installation on their individual devices. Additionally, in such an embodiment of the invention, after a user enrolls, the service receives various items of user and/or transportation-related information (such as detailed herein) sent from a data source to the transmission server. The server can process the information, for example, based upon user-provided user preference information that is stored in memory on the server. Subsequently, an alert is generated containing vehicle pooling/merging information. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a uniform resource locator (URL) associated with the data source provided in the alert) to facilitate a connection from the remote user computer to the data source over the Internet for additional information.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
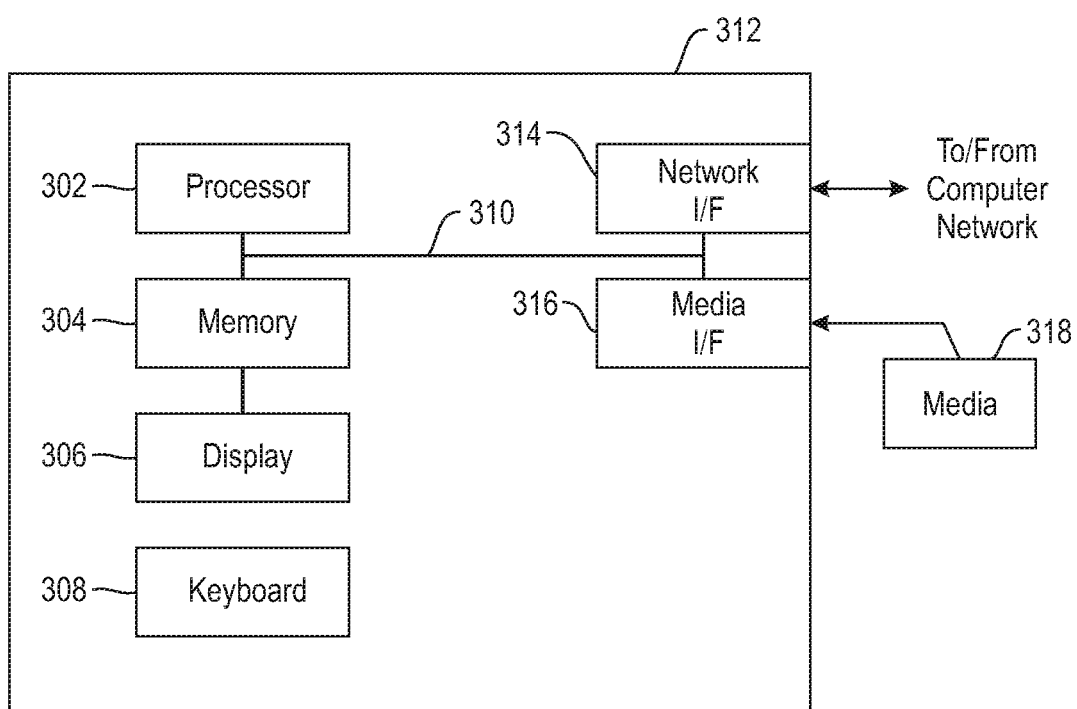
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics Are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, on-the-fly taxi merging and associated incentive mechanisms beneficial for passenger, taxi-drivers, and taxi aggregators based on leveraging supply-demand alignments and virtual waiting time reduction recommendations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining vehicle-sharing user preferences attributed to each of multiple users, wherein the vehicle-sharing user preferences comprises an acceptable amount of time added to a trip due to vehicle-sharing, an acceptable amount of distance added to a trip due to vehicle-sharing, an acceptable number of switches within a vehicle-sharing opportunity, and one or more preferences related to co-passenger compatibility, wherein said determining comprises analyzing (i) one or more vehicle-sharing context-specific questionnaires, (ii) user reviews retrieved from at least one of one or more vehicle-sharing websites and one or more vehicle-sharing applications, and (iii) social network data;
   identifying one or more vehicle-sharing opportunities involving two or more of the multiple users currently riding in two or more vehicles,
   wherein each of the identified vehicle-sharing opportunities comprises (i) a location wherein at least one of the two or more users exits a first of the two or more vehicles and enters a second of the two or more vehicles, wherein the location comprises a vehicle demand that exceeds a pre-determined threshold, and (ii) a temporal range indicating an amount of time until the two or more vehicles will reach the location, and
   wherein said identifying is based on (a) the vehicle-sharing user preferences attributed to each of the two or more users, (b) a current location of each of the two or more vehicles, (c) at least one stated destination of each of the two or more vehicles, and (d) one or more items of traffic information;
   outputting each of the identified vehicle-sharing opportunities to a mobile device of each of the two or more users;
   implementing, among the mobile devices for the two or more users and mobile devices associated with the two or more vehicles for each of the identified vehicle-sharing opportunities, an automated proximity-based token validation mechanism comprising:
      automatically transmitting, via the mobile device associated with the second of the two or more vehicles, a token to at least the mobile device for the at least one user that will exit the first of the two or more vehicles and enter the second of the two or more vehicles at the location;
      automatically sending a notification, via the mobile device associated with the second of the two or more vehicles to each of the mobile devices possessing the token, upon detecting that the second of the two or more vehicles is within a predetermined proximity of the location, wherein said automatically sending the notification comprises using a proximity-based alert protocol comprising one or more beacon-based alerts;
      automatically performing a token verification between the mobile device associated with the second of the two or more vehicles and each of the mobile devices for the one or more users entering the second of the two or more vehicles at the location; and
      automatically transmitting an alert to the mobile device associated with the second of the two or more vehicles upon a determination that a mobile device for a user that entered the second of the two or more vehicles does not possess the token; and implementing a payment model attributed to the identified vehicle-sharing opportunities, wherein the payment model is based on (i) one or more vehicle-related revenue objectives, (ii) a demand forecast related to the location of each of the identified vehicle-sharing opportunities, (iii) a determined amount of total reduction in fuel cost for the two or more vehicles as a result of the identified vehicle-sharing opportunities, and (iv) a determined increase in waiting time for the two or more users as a result of the identified vehicle-sharing opportunities;

wherein the method is carried out by at least one computing device.

2. The computer-implemented method of claim 1, comprising:

applying a weight to each of the vehicle-sharing user preferences based on (i) data attributed to a given user and (ii) historical data attributed to one or more additional users, wherein each weight represents a level of importance attributed to a given user preference relative to the other user preferences.

3. The computer-implemented method of claim 2, comprising:

updating the weight applied to each of the vehicle-sharing user preferences based on updated data attributed to the given user.

4. The computer-implemented method of claim 1, wherein the temporal range indicating the amount of time until the two or more vehicles will reach the location is based on (i) the current location of each of the two or more vehicles and (ii) geographically-relevant traffic conditions.

5. The computer-implemented method of claim 1, wherein the one or more items of traffic information comprises a road network within a pre-determined geographic range of the current location of each of the two or more vehicles and/or the at least one stated destination of each of the two or more vehicles.

6. The computer-implemented method of claim 1, wherein the one or more items of traffic information comprises a demand forecast at the location identified within each of the identified vehicle-sharing opportunities.

7. The computer-implemented method of claim 1, wherein the one or more items of traffic information comprises geographically-relevant traffic conditions.

8. The computer-implemented method of claim 1, wherein the one or more items of traffic information comprises (i) a road network within a pre-determined geographic range of the current location of each of the two or more vehicles and/or the at least one stated destination of each of the two or more vehicles, (ii) a demand forecast at the location identified within each of the identified vehicle-sharing opportunities, and/or (iii) geographically-relevant traffic conditions.

9. A computer program product comprising a computer readable storage medium having program instructions embodied therewith, the program instructions executable by a device to cause the device to:

determine vehicle-sharing user preferences attributed to each of multiple users, wherein the vehicle-sharing user preferences comprises an acceptable amount of time added to a trip due to vehicle-sharing, an acceptable amount of distance added to a trip due to vehicle-sharing, an acceptable number of switches within a vehicle-sharing opportunity, and one or more preferences related to co-passenger compatibility, wherein said determining comprises analyzing (i) one or more vehicle-sharing context-specific questionnaires, (ii) user reviews retrieved from at least one of one or more vehicle-sharing websites and one or more vehicle-sharing applications, and (iii) social network data;

identify one or more vehicle-sharing opportunities involving two or more of the multiple users currently riding in two or more vehicles, wherein each of the identified vehicle-sharing opportunities comprises (i) a location wherein at least one of the two or more users exits a first of the two or more vehicles and enters a second of the two or more vehicles, wherein the location comprises a vehicle demand that exceeds a pre-determined threshold, and (ii) a temporal range indicating an amount of time until the two or more vehicles will reach the location, and wherein said identifying is based on (a) the vehicle-sharing user preferences attributed to each of the two or more users, (b) a current location of each of the two or more vehicles, (c) at least one stated destination of each of the two or more vehicles, and (d) one or more items of traffic information;

output each of the identified vehicle-sharing opportunities to a mobile device of each of the two or more users;

implement, among the mobile devices for the two or more users and mobile devices associated with the two or more vehicles for each of the identified vehicle-sharing opportunities, an automated proximity-based token validation mechanism comprising:

automatically transmitting, via the mobile device associated with the second of the two or more vehicles, a token to at least the mobile device for the at least one user that will exit the first of the two or more vehicles and enter the second of the two or more vehicles at the location;

automatically sending a notification, via the mobile device associated with the second of the two or more vehicles to each of the mobile devices possessing the token, upon detecting that the second of the two or more vehicles is within a predetermined proximity of the location, wherein said automatically sending the notification comprises using a proximity-based alert protocol comprising one or more beacon-based alerts;

automatically performing a token verification between the mobile device associated with the second of the two or more vehicles and each of the mobile devices for the one or more users entering the second of the two or more vehicles at the location; and automatically transmitting an alert to the mobile device associated with the second of the two or more vehicles upon a determination that a mobile device for a user that entered the second of the two or more vehicles does not possess the token; and implement a payment model attributed to the identified vehicle-sharing opportunities, wherein the payment model is based on (i) one or more vehicle-related revenue objectives, (ii) a demand forecast related to the location of each of the identified vehicle-sharing opportunities, (iii) a determined amount of total reduction in fuel cost for the two or more vehicles as a result of the identified vehicle-sharing opportunities, and (iv) a determined increase in waiting time for the two or more users as a result of the identified vehicle-sharing opportunities.

10. The computer program product of claim 9, wherein the program instructions executable by a device further cause the device to:

apply a weight to each of the vehicle-sharing user preferences based on (i) data attributed to a given user and (ii) historical data attributed to one or more additional users, wherein each weight represents a level of importance attributed to a given user preference relative to the other user preferences.

11. A system comprising:

a memory; and at least one processor coupled to the memory and configured for:

determining vehicle-sharing user preferences attributed to each of multiple users, wherein the vehicle-sharing user preferences comprises an acceptable amount of time added to a trip due to vehicle-sharing, an acceptable amount of distance added to a trip due to vehicle-sharing, an acceptable number of switches within a vehicle-sharing opportunity, and one or more preferences related to co-passenger compatibility, wherein said determining comprises analyzing (i) one or more vehicle-sharing context-specific questionnaires, (ii) user reviews retrieved from at least one of one or more vehicle-sharing websites and one or more vehicle-sharing applications, and (iii) social network data;

identifying one or more vehicle-sharing opportunities involving two or more of the multiple users currently riding in two or more vehicles, wherein each of the identified vehicle-sharing opportunities comprises (i) a location wherein at least one of the two or more users exits a first of the two or more vehicles and enters a second of the two or more vehicles, wherein the location comprises a vehicle demand that exceeds a pre-determined threshold, and (ii) a temporal range indicating an amount of time until the two or more vehicles will reach the location, and wherein said identifying is based on (a) the vehicle-sharing user preferences attributed to each of the two or more users, (b) a current location of each of the two or more vehicles, (c) at least one stated destination of each of the two or more vehicles, and (d) one or more items of traffic information;

outputting each of the identified vehicle-sharing opportunities to a mobile device of each of the two or more users;

implementing, among the mobile devices for the two or more users and mobile devices associated with the two or more vehicles for each of the identified vehicle-sharing opportunities, an automated proximity-based token validation mechanism comprising:

automatically transmitting, via the mobile device associated with the second of the two or more vehicles, a token to at least the mobile device for the at least one user that will exit the first of the two or more vehicles and enter the second of the two or more vehicles at the location;

automatically sending a notification, via the mobile device associated with the second of the two or more vehicles to each of the mobile devices possessing the token, upon detecting that the second of the two or more vehicles is within a predetermined proximity of the location, wherein said automatically sending the notification comprises using a proximity-based alert protocol comprising one or more beacon-based alerts;

automatically performing a token verification between the mobile device associated with the second of the two or more vehicles and each of the mobile devices for the one or more users entering the second of the two or more vehicles at the location; and automatically transmitting an alert to the mobile device associated with the second of the two or more vehicles upon a determination that a mobile device for a user that entered the second of the two or more vehicles does not possess the token; and implementing a payment model attributed to the identified vehicle-sharing opportunities, wherein the payment model is based on (i) one or more vehicle-related revenue objectives, (ii) a demand forecast related to the location of each of the identified vehicle-sharing opportunities, (iii) a determined amount of total reduction in fuel cost for the two or more vehicles as a result of the identified vehicle-sharing opportunities, and (iv) a determined increase in waiting time for the two or more users as a result of the identified vehicle-sharing opportunities.

12. A computer-implemented method, comprising:

determining vehicle-sharing user preferences attributed to each of multiple users, wherein the vehicle-sharing user preferences comprises an acceptable amount of time added to a trip due to vehicle-sharing, an acceptable amount of distance added to a trip due to vehicle-sharing, an acceptable number of switches within a vehicle-sharing opportunity, and one or more preferences related to co-passenger compatibility, wherein said determining comprises analyzing (i) one or more vehicle-sharing context-specific questionnaires, (ii) user reviews retrieved from at least one of one or more vehicle-sharing websites and one or more vehicle-sharing applications, and (iii) social network data;

identifying one or more vehicle-sharing opportunities involving two or more of the multiple users currently riding in two or more vehicles, wherein each of the identified vehicle-sharing opportunities comprises (i) a location wherein at least one of the two or more users exits a first of the two or more vehicles and enters a second of the two or more vehicles, wherein the location comprises a vehicle demand that exceeds a pre-determined threshold, and (ii) a temporal range indicating an amount of time until the two or more vehicles will reach the location, and wherein said identifying is based on (a) the vehicle-sharing user preferences attributed to each of the two or more users, (b) a current location of each of the two or more vehicles, (c) at least one stated destination of each of the two or more vehicles, and (d) one or more items of traffic information;

generating a payment model attributed to the identified vehicle-sharing opportunities, wherein the payment model is based at least on (i) one or more vehicle-related revenue objectives, (ii) a demand forecast related to the location of each of the identified vehicle-sharing opportunities, (iii) a determined amount of total reduction in fuel cost for the two or more vehicles as a result of the identified vehicle-sharing opportunities, and (iv) a determined increase in waiting time for the two or more users as a result of the identified vehicle-sharing opportunities;

outputting each of the identified vehicle-sharing opportunities to a mobile device of each of the two or more users;

implementing, among the mobile devices for the two or more users and mobile devices associated with the two or more vehicles for each of the identified vehicle-sharing opportunities, an automated proximity-based token validation mechanism comprising:

automatically transmitting, via the mobile device associated with the second of the two or more vehicles, a token to at least the mobile device for the at least one user that will exit the first of the two or more vehicles and enter the second of the two or more vehicles at the location;

automatically sending a notification, via the mobile device associated with the second of the two or more vehicles to each of the mobile devices possessing the token, upon detecting that the second of the two or more vehicles is within a predetermined proximity of the location, wherein said automatically sending the notification comprises using a proximity-based alert protocol comprising one or more beacon-based alerts;

automatically performing a token verification between the mobile device associated with the second of the two or more vehicles and each of the mobile devices for the one or more users entering the second of the two or more vehicles at the location; and automatically transmitting an alert to the mobile device associated with the second of the two or more vehicles upon a determination that a mobile device for a user that entered the second of the two or more vehicles does not possess the token; and transmitting a payment request to the mobile device of each of the two or more users in accordance with the payment model subsequent to said implementing the automated proximity-based token validation mechanism;

wherein the method is carried out by at least one computing device.

13. The computer-implemented method of claim 12, comprising:

applying a weight to each of the vehicle-sharing user preferences based on (i) data attributed to a given user and (ii) historical data attributed to one or more additional users, wherein each weight represents a level of importance attributed to a given user preference relative to the other user preferences.

\* \* \* \* \*